(12) United States Patent
Lu et al.

(10) Patent No.: US 11,017,010 B2
(45) Date of Patent: May 25, 2021

(54) INTELLIGENT PLAYING METHOD AND APPARATUS BASED ON PREFERENCE FEEDBACK

(71) Applicant: Baidu Online Network Technology (Beijing) Co., Ltd., Beijing (CN)

(72) Inventors: Guang Lu, Beijing (CN); Shui Liu, Beijing (CN); Xiajun Luo, Beijing (CN); Shiquan Ye, Beijing (CN); Qiang Ju, Beijing (CN); Jian Xie, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 117 days.

(21) Appl. No.: 15/856,704

(22) Filed: Dec. 28, 2017

(65) Prior Publication Data

US 2019/0147051 A1    May 16, 2019

(30) Foreign Application Priority Data

Nov. 16, 2017  (CN) .......................... 201711135727.0

(51) Int. Cl.
*G06F 16/432* (2019.01)
*G06F 3/16* (2006.01)
*G06F 16/438* (2019.01)
*G06F 16/635* (2019.01)

(52) U.S. Cl.
CPC ............ *G06F 16/433* (2019.01); *G06F 3/167* (2013.01); *G06F 16/4387* (2019.01); *G06F 16/635* (2019.01); *G06F 16/637* (2019.01)

(58) Field of Classification Search
CPC .... G06F 16/433; G06F 16/4387; G06F 3/167; G06F 16/637; G06F 16/635
See application file for complete search history.

(56) References Cited

U.S. PATENT DOCUMENTS

| | | | |
|---|---|---|---|
| 2003/0236695 A1* | 12/2003 | Litwin, Jr. ......... | G06Q 30/0201 705/7.29 |
| 2008/0065693 A1* | 3/2008 | Malik ..................... | H04H 60/37 |
| 2013/0031162 A1* | 1/2013 | Willis .................. | H04L 65/1069 709/203 |
| 2016/0065637 A1* | 3/2016 | O'Malley ............... | H04L 67/22 709/231 |
| 2016/0232451 A1* | 8/2016 | Scherzer ................. | G06F 16/68 |
| 2017/0358302 A1* | 12/2017 | Orr ....................... | G06F 16/433 |

* cited by examiner

*Primary Examiner* — Michelle M Koeth
(74) *Attorney, Agent, or Firm* — Knobbe, Martens, Olson & Bear, LLP

(57) ABSTRACT

The embodiments of the disclosure disclose an intelligent playing method and apparatus based on preference feedback. An embodiment of the method comprises: receiving voice feedback on currently played multimedia from a user; analyzing a user intention based on the voice feedback; calculating, in response to the user intention indicating updating a currently played multimedia list, a similarity between multimedia in a multimedia database and the current multimedia; and updating the currently played multimedia list based on the voice feedback and the similarity. The embodiment improves the quality and pertinence in playing multimedia.

13 Claims, 7 Drawing Sheets

INTELLIGENT PLAYING METHOD AND APPARATUS BASED ON PREFERENCE FEEDBACK

CROSS-REFERENCE TO RELATED APPLICATION

This application is related to and claims priority from Chinese Application No. 201711135727.0, filed on Nov. 16, 2017, entitled "Intelligent Playing Method And Apparatus based on Preference Feedback," having Baidu Online Network Technology (Beijing) Co., Ltd. as the applicant, the entire disclosure of which is incorporated herein by reference.

TECHNICAL FIELD

The disclosure relates to the field of computer technology, specifically to the field of computer networking technology, and more specifically to an intelligent playing method and apparatus based on preference feedback.

BACKGROUND

With the advent of the network era, increasingly more users are inclined to accept smart service. Taking audio-visual service as an example, smart terminals are expected to understand users' voice input, and provide users with some personalized audio-visual services based on the understanding of the user voice.

At present, in an audio-visual voice interaction scenario using smart terminals, the terminals may first meet real-time retrieval and playing when responding to a user's voice input. Then for any voice feedback from the user, the smart terminals will record the voice feedbacks, in order to provide reference to the user's preference in the future.

SUMMARY

An embodiment of the disclosure provides an intelligent playing method and apparatus based on preference feedback.

In a first aspect, an embodiment of the disclosure provides an intelligent playing method based on preference feedback, including: receiving voice feedback on currently played multimedia from a user; analyzing a user intention based on the voice feedback; calculating, in response to the user intention indicating updating a currently played multimedia list, a similarity between multimedia in a multimedia database and the current multimedia; and updating the currently played multimedia list based on the voice feedback and the similarity.

In some embodiments, updating a currently played multimedia list based on voice feedback and a similarity includes: ordering, in response to the voice feedback being positive feedback, multimedia in a multimedia database by similarity in a descending order to obtain a positive ranking list, and updating a currently played multimedia list using a preset number of popular multimedia in the positive ranking list based on the positive feedback; and ordering, in response to the voice feedback being negative feedback, multimedia in a multimedia database by similarity in an ascending order to obtain a negative ranking list, and updating a currently played multimedia list using a preset number of popular multimedia in the negative ranking list based on the negative feedback.

In some embodiments, the method further includes: obtaining a precondition for voice feedback; analyzing a user intention based on the voice feedback includes: analyzing the user intention based on the voice feedback and the precondition; and updating a currently played multimedia list based on the voice feedback and a similarity includes: updating the currently played multimedia list based on the voice feedback, the precondition and the similarity.

In some embodiments, updating a currently played multimedia list based on voice feedback, a precondition and a similarity includes: ordering, in response to the voice feedback being positive feedback, multimedia in a multimedia database by similarity in a descending order to obtain a positive ranking list, and updating a currently played multimedia list using a preset number of popular multimedia in the positive ranking list based on the positive feedback and a precondition; and ordering, in response to the voice feedback being negative feedback, multimedia in a multimedia database by similarity in an ascending order to obtain a negative ranking list, and updating a currently played multimedia list using a preset number of popular multimedia in the negative ranking list based on the negative feedback and a precondition.

In some embodiments, updating a currently played multimedia list using a preset number of popular multimedia in a positive ranking list based on positive feedback and a precondition includes: updating, in response to the positive feedback being positive feedback on multimedia or a leading author of multimedia and the precondition being random-based play, follow-up multimedia in a currently played multimedia list using a preset number of popular multimedia in a positive ranking list; updating, in response to the positive feedback being positive feedback on a multimedia tag and the precondition being random-based play, follow-up multimedia in a currently played multimedia list using a preset number of popular multimedia including a tag identical to the tag involved in the positive feedback in a positive ranking list; and updating, in response to the positive feedback being positive feedback on a multimedia tag and the precondition being leading-author-based on-demand play, the follow-up multimedia in a currently played multimedia list preferentially using a preset number of popular multimedia by a current leading author and including a tag identical to the tag involved in the positive feedback in a positive ranking list.

In some embodiments, updating a currently played multimedia list using a preset number of popular multimedia in a negative ranking list based on negative feedback and a precondition includes: updating, in response to the negative feedback being negative feedback on multimedia and the precondition being random-based play or multimedia-based on-demand play, current multimedia and follow-up multimedia in a currently played multimedia list using a preset number of popular multimedia in a negative ranking list, and deleting the multimedia hit by the negative feedback from the currently played multimedia list; and updating, in response to the negative feedback being negative feedback on a multimedia tag and the precondition being random-based play or tag-based on-demand play, current multimedia and follow-up multimedia in a currently played multimedia list using a preset number of popular multimedia including a tag different from the tag involved in the negative feedback in a negative ranking list, and deleting the multimedia hit by the tag involved in the negative feedback from the currently played multimedia list.

In some embodiments, the method further includes: modifying, in response to the user intention indicating modifying a currently played multimedia list, the currently played multimedia list based on voice feedback and a precondition; and/or switching, in response to the user intention indicating deleting current multimedia, to next multimedia and deleting the multimedia hit by the negative feedback from the currently played multimedia list.

In some embodiments, modifying, in response to the user intention indicating modifying a currently played multimedia list, the currently played multimedia list includes: modifying, in response to the negative feedback being negative feedback on a leading author of multimedia and the precondition being multimedia-based on-demand play, current multimedia and follow-up multimedia in the currently played multimedia list using a preset number of popular multimedia by other leading author and of the same name as the multimedia involved in the negative feedback in a multimedia database, and deleting the multimedia hit by the negative feedback from the currently played multimedia list; modifying, in response to the negative feedback being negative feedback on a leading author of multimedia and the precondition being random-based play or leading-author-based on-demand play, current multimedia and follow-up multimedia in the currently played multimedia list using a preset number of popular multimedia by a leading author other than the leading author involved in the negative feedback in the multimedia database, and deleting the multimedia hit by the leading author involved in the negative feedback from the currently played multimedia list; and modifying, in response to the negative feedback being negative feedback on a multimedia tag and the precondition being leading-author-based on-demand play, current multimedia and follow-up multimedia in the currently played multimedia list using a preset number of popular multimedia including a tag of the current leading author and different from the tag involved in the negative feedback in the multimedia database, and deleting the multimedia hit by the tag involved in the negative feedback from the currently played multimedia list.

In some embodiments, switching, in response to the user intention indicating deleting current multimedia, to next multimedia and deleting the multimedia hit by negative feedback from a currently played multimedia list includes: switching, in response to the voice feedback being negative feedback on multimedia and the precondition being leading-author-based on-demand play, tag-based on-demand play or interest-list-based on-demand play, to next multimedia and deleting the multimedia hit by the negative feedback from a currently played multimedia list; switching, in response to the voice feedback being negative feedback on a leading author of multimedia and the precondition being tag-based on-demand play or interest-list-based on-demand play, to next multimedia, and deleting the multimedia hit by the leading author involved in the negative feedback from the currently played multimedia list; and switching, in response to the voice feedback being negative feedback on a multimedia tag and the precondition being multimedia-based on-demand play or interest-list-based on-demand play, to next multimedia, and deleting the multimedia hit by the tag involved in the negative feedback from the currently played multimedia list.

In a second aspect, an embodiment of the disclosure provides an intelligent playing apparatus based on preference feedback, including: a voice feedback receiving unit for receiving voice feedback on currently played multimedia from a user; a user intention analyzing unit for analyzing a user intention based on the voice feedback; a similarity calculating unit for calculating, in response to the user intention indicating updating a currently played multimedia list, a similarity between multimedia in a multimedia database and the current multimedia; and a multimedia list updating unit for updating the currently played multimedia list based on the voice feedback and the similarity.

In some embodiments, the multimedia list updating unit is further used for: ordering, in response to the voice feedback being positive feedback, multimedia in a multimedia database by similarity in a descending order to obtain a positive ranking list, and updating a currently played multimedia list using a preset number of popular multimedia in the positive ranking list based on the positive feedback; and ordering, in response to the voice feedback being negative feedback, multimedia in a multimedia database by similarity in an ascending order to obtain a negative ranking list, and updating the currently played multimedia list using a preset number of popular multimedia in the negative ranking list based on the negative feedback.

In some embodiments, the apparatus further includes: a precondition obtaining unit for obtaining a precondition for voice feedback; the user intention analyzing unit is further used for: analyzing a user intention based on the voice feedback and the precondition; and the multimedia list updating unit is further used for: updating the currently played multimedia list based on the voice feedback, the precondition and the similarity.

In some embodiments, the multimedia list updating unit is further used for: ordering, in response to the voice feedback being positive feedback, multimedia in a multimedia database by similarity in a descending order to obtain a positive ranking list, and updating a currently played multimedia list using a preset number of popular multimedia in the positive ranking list based on the positive feedback and the precondition; and ordering, in response to the voice feedback being negative feedback, multimedia in a multimedia database by similarity in an ascending order to obtain a negative ranking list, and updating a currently played multimedia list using a preset number of popular multimedia in the negative ranking list based on the negative feedback and the precondition.

In some embodiments, the multimedia list updating unit is further used for: updating, in response to the positive feedback being positive feedback on multimedia or a leading author of multimedia and the precondition being random-based play, follow-up multimedia in a currently played multimedia list using a preset number of popular multimedia in a positive ranking list; updating, in response to the positive feedback being positive feedback on a multimedia tag and the precondition being random-based play, follow-up multimedia in a currently played multimedia list using a preset number of popular multimedia including a tag identical to the tag involved in the positive feedback in a positive ranking list; and updating, in response to the positive feedback being positive feedback on a multimedia tag and the precondition being leading-author-based on-demand play, follow-up multimedia in a currently played multimedia list preferentially using a preset number of popular multimedia by a current leading author and including a tag identical to the tag involved in the positive feedback in a positive ranking list.

In some embodiments, the multimedia list updating unit is further used for: updating, in response to the negative feedback being negative feedback on multimedia and the precondition being random-based play or multimedia-based on-demand play, current multimedia and follow-up multimedia in a currently played multimedia list using a preset number of popular multimedia in a negative ranking list, and deleting the multimedia hit by the negative feedback from the currently played multimedia list; and updating, in response to the negative feedback being negative feedback on a multimedia tag and the precondition being random-based play or tag-based on-demand play, current multimedia and follow-up multimedia in a currently played multimedia list using a preset number of popular multimedia including a tag different from the tag involved in the negative feedback in a negative ranking list, and deleting the multimedia hit by the tag involved in the negative feedback from the currently played multimedia list.

In some embodiments, the apparatus further includes: a multimedia list modifying unit for modifying, in response to the user intention indicating modifying a currently played multimedia list, the currently played multimedia list based on the voice feedback and the precondition; and/or a current multimedia deleting unit, for switching, in response to the user intention indicating deleting current multimedia, to next multimedia and deleting the multimedia hit by the negative feedback from the currently played multimedia list.

In some embodiments, the multimedia list modifying unit is further used for: modifying, in response to the negative feedback being negative feedback on a leading author of multimedia and the precondition being multimedia-based on-demand play, current multimedia and follow-up multimedia in a currently played multimedia list using a preset number of popular multimedia by other leading author and of the same name as the multimedia involved in the negative feedback in a multimedia database, and deleting the multimedia hit by the negative feedback from the currently played multimedia list; modifying, in response to the negative feedback being negative feedback on a leading author of multimedia and the precondition being random-based play or leading-author-based on-demand play, current multimedia and follow-up multimedia in a currently played multimedia list using a preset number of popular multimedia by a leading author other than the leading author involved in the negative feedback in the multimedia database, and deleting the multimedia hit by the leading author involved in the negative feedback from the currently played multimedia list; and modifying, in response to the negative feedback being negative feedback on a multimedia tag and the precondition being leading-author-based on-demand play, current multimedia and follow-up multimedia in a currently played multimedia list using a preset number of popular multimedia including a tag of a current leading author and different from the tag involved in the negative feedback in the multimedia database, and deleting the multimedia hit by the tag involved in the negative feedback from the currently played multimedia list.

In some embodiments, the current multimedia deleting unit is further used for: switching, in response to the voice feedback being negative feedback on multimedia and the precondition being leading-author-based on-demand play, tag-based on-demand play or interest-list-based on-demand play, to next multimedia and deleting the multimedia hit by the negative feedback from a currently played multimedia list; switching, in response to the voice feedback being negative feedback on a leading author of multimedia and the precondition being tag-based on-demand play or interest-list-based on-demand play, to next multimedia, and deleting the multimedia hit by the leading author involved in the negative feedback from a currently played multimedia list; and switching, in response to the voice feedback being negative feedback on a multimedia tag and the precondition being multimedia-based on-demand play or interest-list-based on-demand play, to next multimedia, and deleting the multimedia hit by the tag involved in the negative feedback from a currently played multimedia list.

In a third aspect, an embodiment of the disclosure provides a system, including: one or more processors; and a storage device for storing one or more programs, where the one or more programs, when executed by the one or more processors, enable the one or more processors to implement the intelligent playing method based on preference feedback according to any one of the embodiments.

In a fourth aspect, an embodiment of the disclosure provides a computer readable storage medium storing computer programs, where the programs, when executed by a processor, enable to implement the intelligent playing method based on preference feedback according to any one of the embodiments.

An intelligent playing method and apparatus based on preference feedback provided in the embodiments of the disclosure firstly receive voice feedback on currently played multimedia from a user; then analyze a user intention based on the voice feedback; then calculate, in response to the user intention indicating updating a currently played multimedia list, a similarity between multimedia in a multimedia database and the current multimedia; and finally update the currently played multimedia list based on the voice feedback and the similarity. In this process, current interest and preference of a user may be determined based on voice feedback on the current multimedia from the user, thereby providing the user with his/her favourite multimedia, and improving the accuracy and pertinence in playing multimedia.

BRIEF DESCRIPTION OF THE DRAWINGS

By reading and referring to the detailed description of non-limiting embodiments provided in the accompanying drawings, other characteristics, objects and advantages of the embodiments of the disclosure will become clearer.

DETAILED DESCRIPTION OF EMBODIMENTS

The embodiments of the disclosure are further described in detail in conjunction with the accompanying drawings and embodiments below. It should be understood that the embodiments described here are only used to illustrate the disclosure, rather than to limit the disclosure. Moreover, it should be noted that, in order to facilitate the description, only the parts related to the disclosure are shown in the accompanying drawings.

It should be noted that, the embodiments and characteristics of the embodiments of the disclosure may be mutually combined as long as no conflict will be caused therefrom. The embodiments of the disclosure will be illustrated in detail by referring to the accompanying drawings and in conjunction with the embodiments below.

Figure 1:
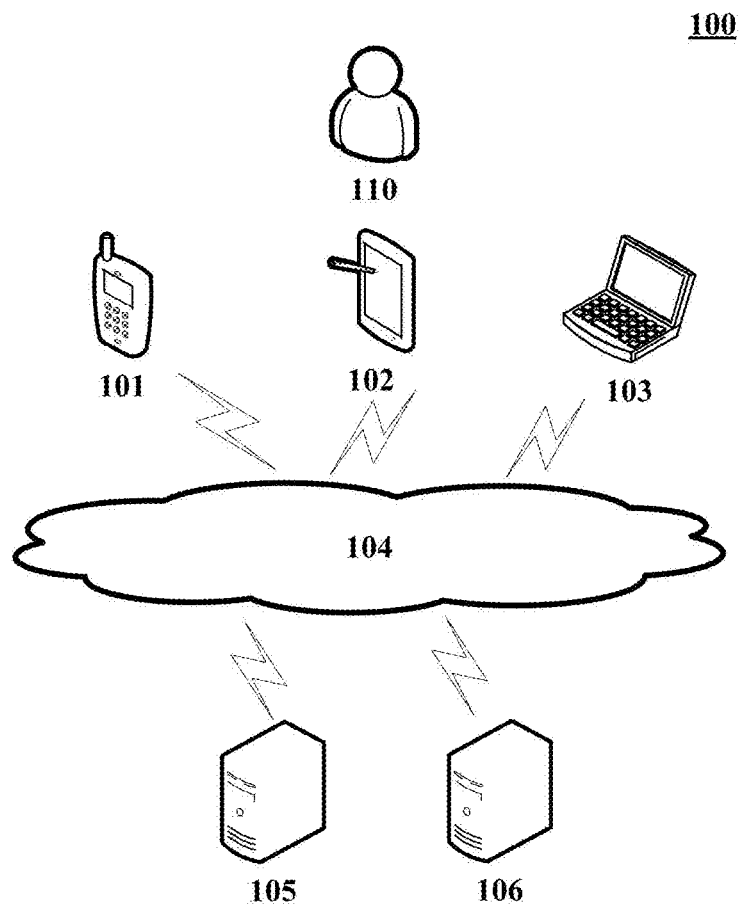
FIG. 1 is an illustrative system structure diagram of an intelligent playing method or apparatus based on preference feedback where the disclosure may be applied.

FIG. 1 shows an illustrative system structure 100 of an embodiment of an intelligent playing method or apparatus based on preference feedback where the disclosure may be applied.

As shown in FIG. 1, a system structure 100 may include terminal devices 101, 102 and 103, a network 104 and servers 105 and 106. The network 104 is used to provide a medium for a communication link between the terminal devices 101, 102 and 103 and the servers 105 and 106. The network 104 may include the connection types, such as a wired connection, a wireless communication link, an optical fiber cable or the like.

A user 110 may interact with the servers 105 and 106 using the terminal devices 101, 102 and 103 through the network 104 to receive or send messages, etc. The terminal devices 101, 102 and 103 may be installed with the communication client applications, such as search engine applications, shopping applications, instant messaging tools, email clients, social platform applications and AV player applications.

The terminal devices 101, 102 and 103 may be electronic devices including display screens, including but not limited to: smart loudspeaker boxes, smart phones, wearable devices, tablet PCs, e-book readers, MP3 players (Moving Picture Experts Group Audio Layer III), MP4 (Moving Picture Experts Group Audio Layer IV) players, laptop portable computers, desk computers, etc.

The servers 105 and 106 may be servers providing a variety of services, such as background servers providing supports for the terminal devices 101, 102 and 103. The background servers may, e.g., analyze or calculate terminal data, and push the analysis or calculation results to the terminal terminals.

It should be noted that the intelligent playing method based on preference feedback provided in embodiments of the disclosure is generally executed by the servers 105 and 106 or the terminal devices 101, 102 and 103, and correspondingly, the intelligent playing apparatus based on preference feedback is generally arranged in the servers 105 and 106 or the terminal devices 101, 102 and 103.

It should be understood that the numbers of terminal devices, networks and servers in FIG. 1 are only indicative. Depending on the actual needs, any numbers of terminal devices, networks and servers may exist.

Figure 2:
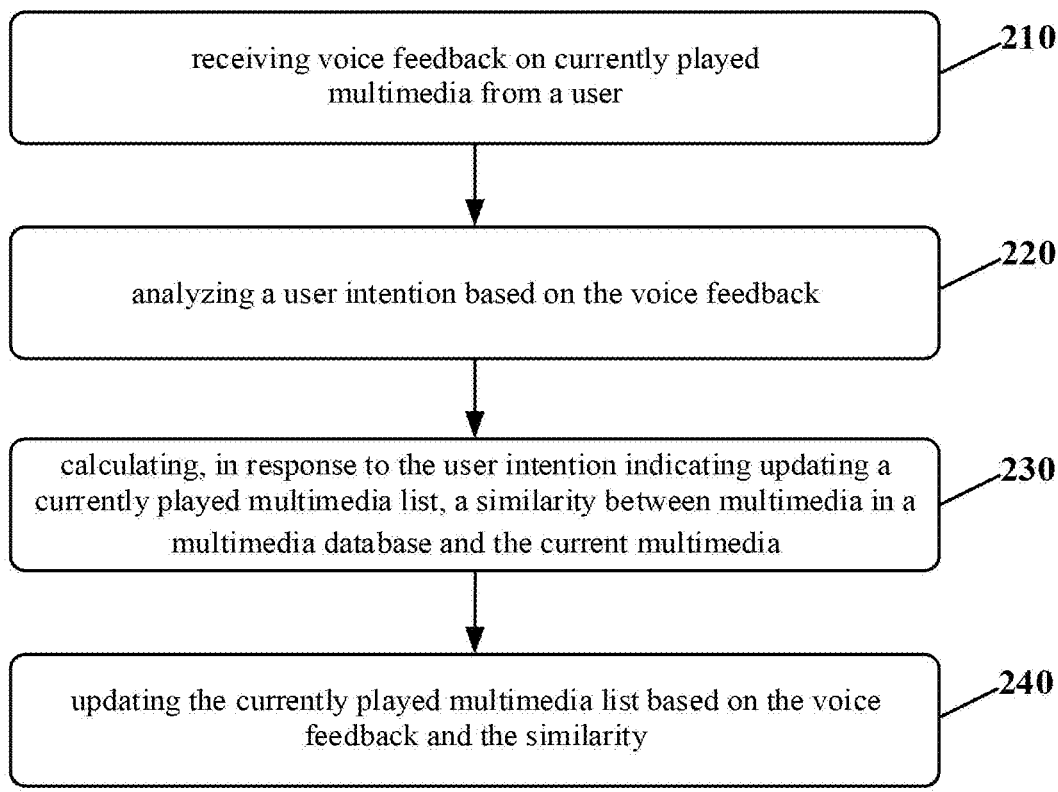
FIG. 2 is an illustrative process diagram of a first embodiment of an intelligent playing method based on preference feedback according to the disclosure.

Further referring to FIG. 2, an illustrative process of an embodiment of an intelligent playing method based on preference feedback according to the disclosure is shown.

As shown in FIG. 2, the intelligent playing method 200 based on preference feedback includes the following steps:

In Step 210, voice feedback on currently played multimedia from a user is received.

In this embodiment, an electronic device (e.g., a server shown in FIG. 1 or a terminal device shown in FIG. 1) on which an intelligent playing method based on preference feedback runs may receive voice feedback inputted by a user through a microphone of a terminal device.

The voice feedback here is used for indicating users' opinions or comments on current multimedia played by a terminal device. For example, the voice feedback may include any one or more of the following items: voice feedback on multimedia; voice feedback on a predetermined multimedia list; voice feedback on a leading author of multimedia; and voice feedback on a multimedia tag. The multimedia here may be audio, video, or a combination of audio and video. The predetermined list here refers to a list, e.g., a topic list or an interest list, that is generated based on a predetermined topic or interest, and is selected by a user or provided by a terminal device application provider. The leading author here refers to a main author of multimedia. The tag here refers to a language, a style, a scenario, an emotion, a topic or the like of multimedia.

In some modes of implementing this embodiment, a terminal device may first receive an awakening instruction inputted by a user; and then feed back reply information by voice, and receive voice feedback on a currently played multimedia from the user.

Taking multimedia being a song in audio content as an example, a terminal device may receive a user's voice input "little A", where the "little A" is a predetermined awakening instruction; send voice feedback "OK!" to the user, and then receive voice feedback on a currently played multimedia, such as "this song sounds really good" or "I like AA's song", from the user.

In Step 220, a user intention is analyzed based on the voice feedback.

In this embodiment, an electronic device on which an intelligent playing method based on preference feedback runs may identify real-time voice feedback as a text, implement semantic analysis of the text to obtain a sementeme included in the voice feedback, and then analyze a user intention based on the identified sementeme.

The method for analyzing the user intention may be a method for analyzing a user intention in the prior art or a technique to be developed in the future, and is not limited by the disclosure. For example, a user intention may be analyzed using a preset rule, and may also be identified using a pre-trained user intention identification model.

The preset rule for analyzing a user intention may be obtained based on user settings or be concluded based on learning historical data of the user. When a semantic identification result of voice feedback hits a condition existing in the preset rule, it indicates that the user intention is an action to be executed as provided in the preset rule. For example, based on historical data of a user: after the user sends voice feedback "I like AA's song" to a smart loudspeaker box, the user will have a high probability of inputting a voice request "play AA's song", and then based on the historical data of the user, the preset rule may be concluded by learning: when the real-time voice feedback meets a predetermined condition "I like XX's song", an executable action "play XX's song", e.g., updating the currently played multimedia list by adding XX's song therein, may be obtained.

A pre-trained user intention identification model for analyzing a user intention may be a machine learning model obtained by training with a large data sample including historical data of a user. By inputting voice feedback or a semantic identification result into the machine learning model, a user intention outputted by the machine learning model may be obtained based on the voice feedback. For example, samples of voice feedback "I like AA's song" and a followed action "play AA's song" requested by a user for execution in historical data of the user may be learned through a convolutional neural network model, a recurrent neural network model or a deep neural network model to obtain the convolutional neural network model, the recurrent neural network model or the deep neural network model by training. Then the voice feedback "I like XX's song" inputted by the user is identified using the well-trained deep neural network model to obtain the user intention "play XX's song" of the voice feedback.

In Step 230, a similarity between multimedia in a multimedia database and the current multimedia is calculated in response to the user intention indicating updating a currently played multimedia list.

In this embodiment, an electronic device on which an intelligent playing method based on preference feedback runs may calculate, in response to the user intention indicating updating a currently played multimedia list, a similarity between multimedia in a multimedia database and the current multimedia, so as to recommend to the user his/her favourite multimedia based on the user preference reflected in voice feedback.

The similarity here may be determined based on one or more of the following parameters of multimedia in a multimedia database and the current multimedia: a co-occurrence probability in a predetermined list (such as a topic list and/or an interest list); whether belonging to one leading author; and whether belonging to one tag.

The method for determining the similarity may be a method for calculating a similarity in the prior art or a technique to be developed in the future, and is not limited in the disclosure. Examples of the method include a method for calculating a distance using vector angle cosine, a nearest neighbor algorithm, a clustering algorithm, etc.

In Step 240, a currently played multimedia list is updated based on voice feedback and a similarity.

In this embodiment, multimedia may be extracted from a multimedia database based on a similarity and voice feedback to update a currently played multimedia list. For example, if the voice feedback is "this song sounds really good", then songs that are highly similar to the current song may be extracted from a song database to generate a positive ranking list; while if the voice feedback is "AA's song sounds too bad", then songs that are less similar to the current song may be extracted from a song database to generate a negative ranking list.

In some optional modes of implementing this embodiment, updating a currently played multimedia list based on voice feedback and a similarity includes: ordering, in response to the voice feedback being positive feedback, multimedia in a multimedia database by similarity in a descending order to obtain a positive ranking list, and updating a currently played multimedia list using a preset number of popular multimedia in the positive ranking list based on the positive feedback; and ordering, in response to the voice feedback being negative feedback, multimedia in a multimedia database by similarity in an ascending order to obtain a negative ranking list, and updating a currently played multimedia list using a preset number of popular multimedia in the negative ranking list based on the negative feedback.

In this embodiment, if predetermined voice feedback is positive feedback, e.g., the voice feedback is a positive evaluation on a current song, it indicates a user's preference for playing parameters of currently played multimedia, and then under the circumstance, a currently played multimedia list is updated using multimedia that is highly similar to the currently played multimedia based on the positive evaluation; if predetermined voice feedback is negative feedback, e.g., the voice feedback is a negative evaluation on a current song, it indicates a user's dislike for playing parameters of currently played multimedia, and then a currently played multimedia list is updated using multimedia that is less similar to the currently played multimedia based on the negative evaluation The playing parameters here may include one or more of the following parameters: a name, a leading author, a multimedia list and a tag, where the multimedia list may further include a topic multimedia list (such as a song album) and an interest multimedia list (such as a song list), and the tag may further include a language (such as Chinese, English, Cantonese, European language, American, Japanese, Korean, etc.), a style (e.g., a classical style, a modern style, etc.), a scenario (e.g., sports, learning, etc.), an emotion (e.g., excited, sad, healing, etc.), a topic (e.g., network, cartoon, classic, list), etc.

Description is made below with multimedia being a song in audio as an example. In the playing parameters, the multimedia name may be a song name; the leading author may be a singer, a lyricist or a composer; the topic multimedia list may be an album; the interesting multimedia list may be a song list; the language may be Chinese, Cantonese, English, Japanese, Korean, German, French, or other languages; the style may be pop, rock and roll, folk, electronic music, dance music, rap, light music, jazz, country music, black music, classical music, folk music, British style, metal music, punk, blues, reggae, Latin, alternative style, new era style, ancient style, post-rock, new jazz or the like; the scenario may be early morning, night, learning, work, lunch break, afternoon tea, subway, driving, sports, travel, walking, bar or the like; the emotion may be nostalgic, fresh, romantic, sexy, sad, healing, relaxing, lonely, touching, excited, happy, quiet, missing or the like; the topic may be: original soundtrack, cartoon, campus, game, post-70s, post-80s, post-90s, network songs, KTV, classic, cover version, guitar, piano, instrumental music, children, list, post-00s or the like.

An intelligent playing method based on preference feedback provided in the embodiments of the disclosure first receives voice feedback on currently played multimedia from a user; then analyzes a user intention based on the voice feedback; then calculates, in response to the user intention indicating updating a currently played multimedia list, a similarity between multimedia in a multimedia database and the current multimedia; and finally updates the currently played multimedia list based on the voice feedback and the similarity. In this process, the currently played multimedia list is updated based on the voice feedback and the similarity, so that the played multimedia better satisfies user demands, thereby improving the accuracy and pertinence in playing multimedia for users.

Figure 3:
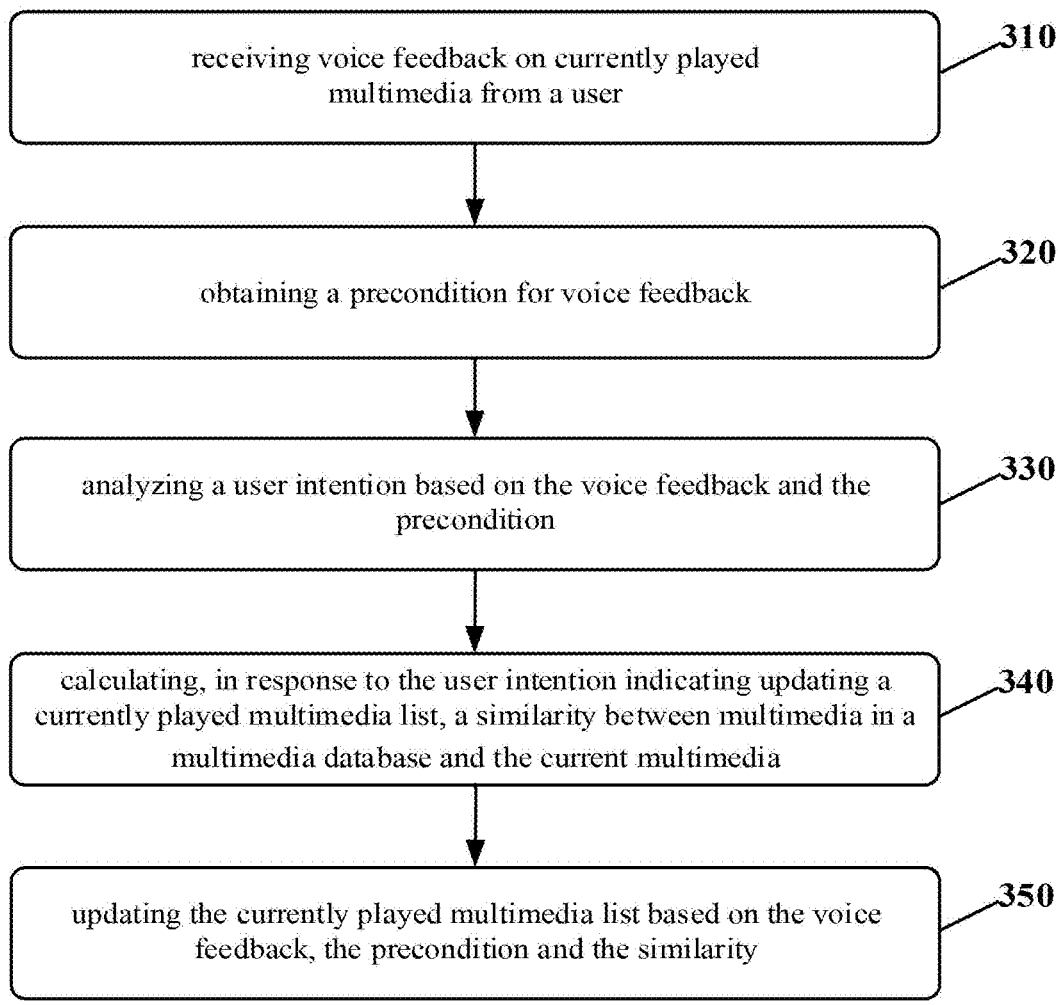
FIG. 3 is an illustrative process diagram of a second embodiment of an intelligent playing method based on preference feedback according to the disclosure.

Further referring to FIG. 3, an illustrative process of a second embodiment of an intelligent playing method based on preference feedback according to the disclosure is shown.

As shown in FIG. 3, the intelligent playing method 300 based on preference feedback includes:

In Step 310, voice feedback on currently played multimedia from a user is received.

In this embodiment, an electronic device (e.g., a server shown in FIG. 1 or a terminal device shown in FIG. 1) on which an intelligent playing method based on preference feedback runs may receive voice feedback inputted by a user through a microphone of a terminal device.

The voice feedback here is used for indicating users' opinions or comments on current multimedia played by a terminal device. For example, the voice feedback may include any one or more of the following items: voice feedback on multimedia; voice feedback on a predetermined multimedia list; voice feedback on a leading author of multimedia; and voice feedback on a multimedia tag. The multimedia here may be audio, video, or a combination of audio and video. The predetermined list here refers to a list, e.g., a topic list or an interest list, that is generated based on a predetermined topic or interest, and is selected by a user or provided by a terminal device application provider. The leading author here refers to a main author of multimedia. The tag here refers to a language, a style, a scenario, an emotion, a topic or the like of multimedia.

In Step 320, a precondition for voice feedback is obtained.

In this embodiment, an electronic device (e.g., a server shown in FIG. 1 or a terminal device shown in FIG. 1) on which an intelligent playing method based on preference feedback runs may obtain a precondition of current multimedia through an application of multimedia that is being played by a terminal device.

The precondition here refers to a playing instruction triggering playing current multimedia, such as random-based play, multimedia-based on-demand play, leading-author-based on-demand play, tag-based on-demand play, list-based on-demand play, or the like. Here, the on-demand random-based play refers to random-based play and multimedia-based on-demand play; the multimedia-based on-demand play refers to on-demand play based on a multimedia name; the leading-author-based on-demand play refers to on-demand play based on a leading author of multimedia; the tag-based on-demand play refers to on-demand play based on a multimedia tag; and the on-demand play of a list refers to on-demand play based on a multimedia list, such as on-demand play based on a topic list or an interest list.

In Step 330, a user intention is analyzed based on voice feedback and a precondition.

In this embodiment, an electronic device on which an intelligent playing method based on preference feedback runs may identify real-time voice feedback as a text, implement semantic analysis of the text to obtain a sememe included in the voice feedback, and then analyze a user intention based on the identified sememe and a precondition.

The method for analyzing the user intention may be a method for analyzing a user intention in the prior art or a technique to be developed in the future, and is not limited in the disclosure. For example, a user intention may be analyzed using a preset rule, and may also be identified using a pre-trained user intention identification model.

The preset rule for analyzing a user intention may be obtained based on user settings or be concluded based on learning historical data of the user. When a semantic identification result of voice feedback and a precondition hit a condition existing in the preset rule, it indicates that the user intention is an action to be executed as provided in the preset rule. For example, based on historical data of a user: when a user sends voice feedback "I like AA's song" to a smart loudspeaker box, the user will have a high probability of inputting a voice request "play AA's song", and then based on the historical data of the user, the preset rule may be concluded by learning: when the real-time voice feedback meets a predetermined condition "I like XX's song", an executable action "play XX's song", e.g., updating the currently played multimedia list by adding XX's song therein, may be obtained.

A pre-trained user intention identification model for analyzing a user intention may be a machine learning model obtained by training based on a large data sample including historical data of a user. By inputting voice feedback and a precondition or inputting a semantic identification result and the precondition into the machine learning model, a user intention outputted by the machine learning model may be obtained by analysis based on the voice feedback and the precondition or based on the semantic identification result and the precondition. For example, samples of voice feedback "I like AA's song" and a precondition "random-based play" and a followed action "play AA's song" requested by a user for execution in historical data of the user may be learned through a convolutional neural network model, a recurrent neural network model or a deep neural network model to obtain the convolutional neural network model, the recurrent neural network model or the deep neural network model by training, and then the voice feedback "I like XX's song" inputted by the user and the precondition "random-based play" are identified using the well-trained deep neural network model to obtain the user intention "play XX's song" of the voice feedback.

In Step 340, a similarity between multimedia in a multimedia database and the current multimedia is calculated in response to the user intention indicating updating a currently played multimedia list.

In this embodiment, an electronic device on which an intelligent playing method based on preference feedback runs may calculate, in response to the user intention indicating updating a currently played multimedia list, a similarity between multimedia in a multimedia database and the current multimedia, so as to recommend to the user his/her favourite multimedia based on the user preference reflected in voice feedback and a precondition.

The similarity here may be determined based on one or more of the following parameters of multimedia in a multimedia database and the current multimedia: a co-occurrence probability in a predetermined list (such as a topic list and/or an interest list); whether belonging to one leading author; and whether including one tag.

The method for determining the similarity may be a method for calculating a similarity in the prior art or a technique to be developed in the future, and is not limited in the disclosure. Examples of the method include a method for calculating a distance using vector angle cosine, a nearest neighbor algorithm, a clustering algorithm, etc.

In Step 350, a currently played multimedia list is updated based on voice feedback, a precondition and a similarity.

In this embodiment, multimedia may be extracted from a multimedia database based on a similarity, a precondition and voice feedback to update a currently played multimedia list. For example, if the voice feedback is "I like this style", and the precondition is "random-based play", then songs that are highly similar to the current song may be extracted from a song database to generate a positive ranking list, and current multimedia and follow-up multimedia in a played multimedia list are updated using the positive ranking list; while if the voice feedback is "the song sounds bad" and the precondition is "random-based play", then popular songs less similar to the current song may be extracted from a song database to generate a negative ranking list, and current multimedia and follow-up multimedia in a currently played multimedia list are updated using the negative ranking list.

In some optional modes of implementing this embodiment, updating a currently played multimedia list based on voice feedback, a precondition and a similarity includes: ordering, in response to the voice feedback being positive feedback, multimedia in a multimedia database by similarity in a descending order to obtain a positive ranking list, and updating a currently played multimedia list using a preset number of popular multimedia in the positive ranking list based on the positive feedback and a precondition; and ordering, in response to the voice feedback being negative feedback, multimedia in a multimedia database by similarity in an ascending order to obtain a negative ranking list, and updating a currently played multimedia list using a preset number of popular multimedia in the negative ranking list based on the negative feedback and a precondition.

In this mode of implementing this embodiment, if predetermined voice feedback is positive feedback, e.g., the voice feedback is a positive evaluation on a current song, it indicates a user's preference for playing parameters of currently played multimedia, and then under the circumstance, a currently played multimedia list is updated using multimedia that is highly similar to the currently played multimedia based on the positive evaluation and a precondition; while if predetermined voice feedback is negative feedback, e.g., the voice feedback is a negative evaluation on a current song, it indicates a user's dislike for playing parameters of currently played multimedia, and then a currently played multimedia list is updated using multimedia that is less similar to the currently played multimedia based on the negative evaluation and a precondition.

The playing parameters here may include one or more of the following parameters: a name, a leading author, a multimedia list and a tag, where the multimedia list may further include a topic multimedia list (such as a song album) and an interest multimedia list (such as a song list), and the tag may further include a language (such as Chinese, English, Cantonese, European language, American, Japanese, Korean, etc.), a style (e.g., a classical style, a modern style, etc.), a scenario (e.g., sports, learning, etc.), an emotion (e.g., excited, sad, healing, etc.), a topic (e.g., network, cartoon, classic, list), etc.

For example, some application scenarios of updating a currently played multimedia list using a preset number of popular multimedia in a positive ranking list based on positive feedback and a precondition are described below:

In a first scenario, in response to the positive feedback being positive feedback on multimedia or a leading author of multimedia and the precondition being random-based play, follow-up multimedia in a currently played multimedia list is updated using a preset number of popular multimedia in a positive ranking list. For example, a user first inputs "random-based play of a song" by voice, a terminal device implements random-based play of a current song, and then the user sends voice feedback "I like this song" or "I like this singer" on the current song. Under the circumstance, follow-up multimedia may be updated using a preset number of popular songs highly similar to the currently played song in a positive ranking list based on the currently played song, so as to recommend personalized songs to the user.

In a second scenario, in response to the positive feedback being positive feedback on a multimedia tag and the precondition being random-based play, follow-up multimedia in a currently played multimedia list is updated using a preset number of popular multimedia including a tag identical to the tag involved in the positive feedback in a positive ranking list. For example, a user first inputs "random-based play of a song" by voice, a terminal device implements random-based play of a current song, and then the user sends voice feedback "I like this style" on the current song. Under the circumstance, follow-up multimedia may be updated using a preset number of popular songs highly similar to the currently played song in a positive ranking list based on the currently played song, so as to recommend personalized songs to the user.

In a third scenario, in response to the positive feedback being positive feedback on a multimedia tag and the precondition being leading-author-based on-demand play, follow-up multimedia in a currently played multimedia list is updated preferentially using a preset number of popular multimedia of a current leading author and including a tag identical to the tag involved in the positive feedback in a positive ranking list. For example, a user first inputs "I'd like to listen to AA's song" by voice, a terminal device plays a popular song of AA, and then the user sends voice feedback "I like this style" on the current song. Under the circumstance, follow-up multimedia may be updated using a preset number of popular songs of the current style and highly similar to the currently played song in a positive ranking list based on the currently played song, so as to recommend personalized songs to the user.

For example, some application scenarios of updating a currently played multimedia list using a preset number of popular multimedia in a negative ranking list based on negative feedback and a precondition are described below:

In a first scenario, in response to the negative feedback being negative feedback on multimedia and the precondition being random-based play or multimedia-based on-demand play, current multimedia and follow-up multimedia in a currently played multimedia list are updated using a preset number of popular multimedia in a negative ranking list, and the multimedia hit by the negative feedback is deleted from the currently played multimedia list. For example, a user first inputs "random-based play of a song" by voice, and a terminal device implements random-based play of a song, or the user first inputs "I'd like to listen to BB (a song name)" by voice, and the terminal device plays the song of various versions ordered by popularity. Then, the user sends voice feedback "this song sounds bad" on the currently played song. Under the circumstance, current multimedia and follow-up multimedia may be updated using a preset number of popular songs less similar to the currently played song in a negative ranking list based on the currently played song, so as to recommend personalized songs to the user.

In a second scenario, in response to the negative feedback being negative feedback on a multimedia tag and the precondition being random-based play or tag-based on-demand play, current multimedia and follow-up multimedia in a currently played multimedia list are updated using a preset number of popular multimedia including a tag different from the tag involved in the negative feedback in a negative ranking list, and the multimedia hit by the negative feedback is deleted from the currently played multimedia list. For example, a user first inputs "random-based play of a song" by voice, and a terminal device implements random-based play of a song, or the user first inputs "I'd like to listen to a folk song", and the terminal device plays songs including a tag of folk ordered by popularity. Then, the user sends voice feedback "I dislike this style" on the currently played song. Under the circumstance, current multimedia and follow-up multimedia may be updated using a preset number of popular multimedia less similar to the currently played song and including a tag different from the tag involved in the negative feedback in a negative ranking list based on the currently played song, so as to recommend personalized songs to the user.

An intelligent playing method based on preference feedback provided in the embodiments of the disclosure first receives voice feedback on currently played multimedia from a user; then obtains a precondition for the voice feedback, then analyzes a user intention based on the voice feedback and the precondition; then calculates, in response to the user intention indicating updating a currently played multimedia list, a similarity between multimedia in a multimedia database and the current multimedia; and finally updates the currently played multimedia list based on the voice feedback, the precondition and the similarity. In this process, the currently played multimedia list is updated based on the voice feedback, the precondition and the similarity, and parameters for analyzing a user intention are increased, so that the played multimedia better satisfies user demands, thereby improving the accuracy and pertinence in playing multimedia for users.

Figure 4:
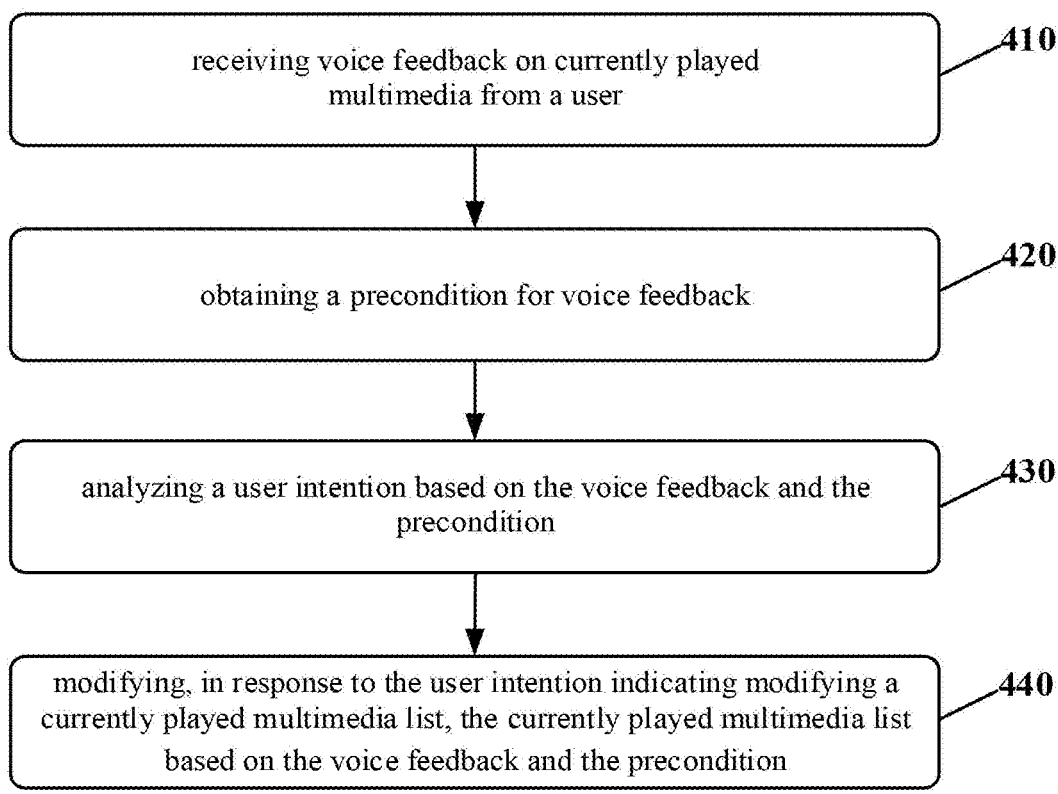
FIG. 4 is an illustrative process diagram of a third embodiment of an intelligent playing method based on preference feedback according to the disclosure.

Further referring to FIG. 4, an illustrative process of a third embodiment of an intelligent playing method based on preference feedback according to the disclosure is shown.

As shown in FIG. 4, the intelligent playing method 400 based on preference feedback includes:

In Step 410, voice feedback on currently played multimedia from a user is received.

In this embodiment, an electronic device (e.g., a server shown in FIG. 1 or a terminal device shown in FIG. 1) on which an intelligent playing method based on preference feedback runs may receive voice feedback inputted by a user through a microphone of a terminal device.

The voice feedback here is used for indicating users' opinions or comments on current multimedia played by a terminal device. For example, the voice feedback may include any one or more of the following items: voice feedback on multimedia; voice feedback on a predetermined multimedia list; voice feedback on a leading author of multimedia; and voice feedback on a multimedia tag. The multimedia here may be audio, video, or a combination of audio and video. The predetermined list here refers to a list, e.g., a topic list or an interest list, that is generated based on a predetermined topic or interest, and is selected by a user or provided by a terminal device application provider. The leading author here refers to a main author of multimedia. The tag here refers to a language, a style, a scenario, an emotion, a topic or the like of multimedia.

In Step 420, a precondition for voice feedback is obtained.

In this embodiment, an electronic device (e.g., a server shown in FIG. 1 or a terminal device shown in FIG. 1) on which an intelligent playing method based on preference feedback runs may obtain a precondition of current multimedia through an application of multimedia that is being played by a terminal device.

The precondition here refers to a playing instruction triggering playing current multimedia, such as on-demand random-based play, multimedia-based on-demand play, leading-author-based on-demand play, tag-based on-demand play, on-demand play of a list, or the like. Here, the on-demand random-based play refers to random-based play and multimedia-based on-demand play; the multimedia-based on-demand play refers to on-demand play based on a multimedia name; the leading-author-based on-demand play refers to on-demand play based on a leading author of multimedia; the tag-based on-demand play refers to on-demand play based on a multimedia tag; and the on-demand play of a list refers to on-demand play based on a multimedia list, such as on-demand play based on a topic list or an interest list.

In Step 430, a user intention is analyzed based on the voice feedback and the precondition.

In this embodiment, an electronic device on which an intelligent playing method based on preference feedback runs may identify real-time voice feedback as a text, implement semantic analysis of the text to obtain a semanteme included in the voice feedback, and then analyze a user intention based on the identified semanteme and a precondition.

The method for analyzing the user intention may be a method for analyzing a user intention in the prior art or a technique to be developed in the future, and is not limited in the disclosure. For example, a user intention may be analyzed using a preset rule, and may also be identified using a pre-trained user intention identification model.

The preset rule for analyzing a user intention may be obtained based on user settings or be concluded based on learning historical data of the user. When a semantic identification result of voice feedback and a precondition hit a condition existing in the preset rule, it indicates that the user intention is an action to be executed as provided in the preset rule. For example, based on historical data of a user: when a user sends voice feedback "I dislike the singer AA" to a smart loudspeaker box, and the precondition is "on-demand play of a song", the user will have a high probability of inputting a voice request "recommend a popular song of a singer other than the singer and switch to the next", and then based on the historical data of the user, the preset rule may be concluded by learning: when the real-time voice feedback meets a predetermined condition "I dislike the singer XX", and the precondition is "on-demand play of a song", an executable action "recommend a popular song of a singer other than the singer and switch to the next" may be obtained.

A pre-trained user intention identification model for analyzing a user intention may be a machine learning model obtained by training based on a large data sample including historical data of a user. By inputting voice feedback and a precondition or inputting a semantic identification result and the precondition into the machine learning model, a user intention outputted by the machine learning model may be obtained by analysis based on the voice feedback and the precondition or based on the semantic identification result and the precondition. For example, samples of an action "recommend a popular song of a singer other than the singer and switch to the next" executed in response to the voice feedback "I dislike the singer AA" and a precondition "on-demand play of a song" in historical data of a user may be learned through a convolutional neural network model, a recurrent neural network model or a deep neural network model to obtain the convolutional neural network model, the recurrent neural network model or the deep neural network model by training, and then the voice feedback "I dislike XX's song" inputted by the user and the precondition "on-demand play of a song" are identified using the well-trained model to obtain the user intention "recommend a popular song of a singer other than the singer and switch to the next" of the voice feedback.

In Step 440, the currently played multimedia list is modified based on the voice feedback and the precondition in response to the user intention indicating modifying a currently played multimedia list.

In this embodiment, in response to the user intention indicating modifying a currently played multimedia list, multimedia may be extracted from a multimedia database to update the currently played multimedia list based on a precondition and voice feedback. For example, if the voice feedback is "I dislike this style", and the precondition is "on-demand play of a singer", then current multimedia and follow-up multimedia in a played multimedia list may be modified into songs of "other styles of the singer"; while if the voice feedback is "I dislike this singer" and the precondition is "random-based play" or "on-demand play of a singer", then current multimedia and follow-up multimedia in a currently played multimedia list may be modified into popular songs of a singer other than the current singer extracted from a song database.

For example, some application scenarios of modifying, in response to the user intention indicating modifying a currently played multimedia list, the currently played multimedia list based on voice feedback and a precondition are described below:

In a first scenario, in response to the negative feedback being negative feedback on a leading author of multimedia and the precondition being multimedia-based on-demand play, current multimedia and follow-up multimedia in a currently played multimedia list are modified using a preset number of popular multimedia by other leading author and of the same name as the multimedia involved in the negative feedback in a multimedia database, and the multimedia hit by the negative feedback is deleted from the currently played multimedia list. For example, a user first inputs "I'd like to listen to BB (a song name)" by voice, and then a terminal device plays the song of various versions ordered by popularity. Then, the user sends voice feedback "I dislike this singer" on the current song. Under the circumstance, current multimedia and follow-up multimedia in the currently played multimedia list may be updated using a preset number of popular multimedia by other leading author and of the same name as "BB" in a multimedia database, and the multimedia hit by the leading author of the negative feedback may be deleted from the currently played multimedia list.

In a second scenario, in response to the negative feedback being negative feedback on a leading author of multimedia and the precondition being random-based play or leading-author-based on-demand play, current multimedia and follow-up multimedia in a currently played multimedia list are modified using a preset number of popular multimedia by a leading author other than the leading author involved in the negative feedback in a multimedia database, and the multimedia hit by the negative feedback is deleted from the currently played multimedia list. For example, a user first inputs "random-based play of a song" by voice, and then a terminal device implements random-based play of a song, or the user first inputs "I'd like to listen to AA's song", and then the terminal device plays a popular song of AA. Then, the user sends voice feedback "I dislike this singer" on the current song. Under the circumstance, current multimedia and follow-up multimedia in the currently played multimedia list may be updated using a preset number of popular multimedia by a leading author other than "AA" in a multimedia database, and the multimedia hit by the negative feedback may be deleted from the currently played multimedia list.

In a third scenario, in response to the negative feedback being negative feedback on a multimedia tag and the precondition being leading-author-based on-demand play, current multimedia and follow-up multimedia in a currently played multimedia list are modified using a preset number of popular multimedia including a tag of a current leading author and different from the tag involved in the negative feedback in a multimedia database, and the multimedia hit by the negative feedback is deleted from the currently played multimedia list. For example, a user first inputs "I'd like to listen to AA's song", and then a terminal device plays a popular song of AA. Then, the user sends voice feedback "I dislike the style" on the current song. Under the circumstance, current multimedia and follow-up multimedia in the currently played multimedia list may be updated using a preset number of popular multimedia by the current leading author "AA" and of other styles in a multimedia database, and the multimedia hit by the negative feedback may be deleted from the currently played multimedia list.

An intelligent playing method based on preference feedback provided in the embodiments of the disclosure first receives voice feedback on currently played multimedia from a user; then obtains a precondition for the voice feedback, then analyzes a user intention based on the voice feedback and the precondition; and then modifies, in response to the user intention indicating modifying a currently played multimedia list, the currently played multimedia list. In this process, the currently played multimedia list is modified based on the voice feedback and the precondition, so that the played multimedia better satisfies user demands, thereby improving the accuracy and pertinence in playing multimedia for users.

Figure 5:
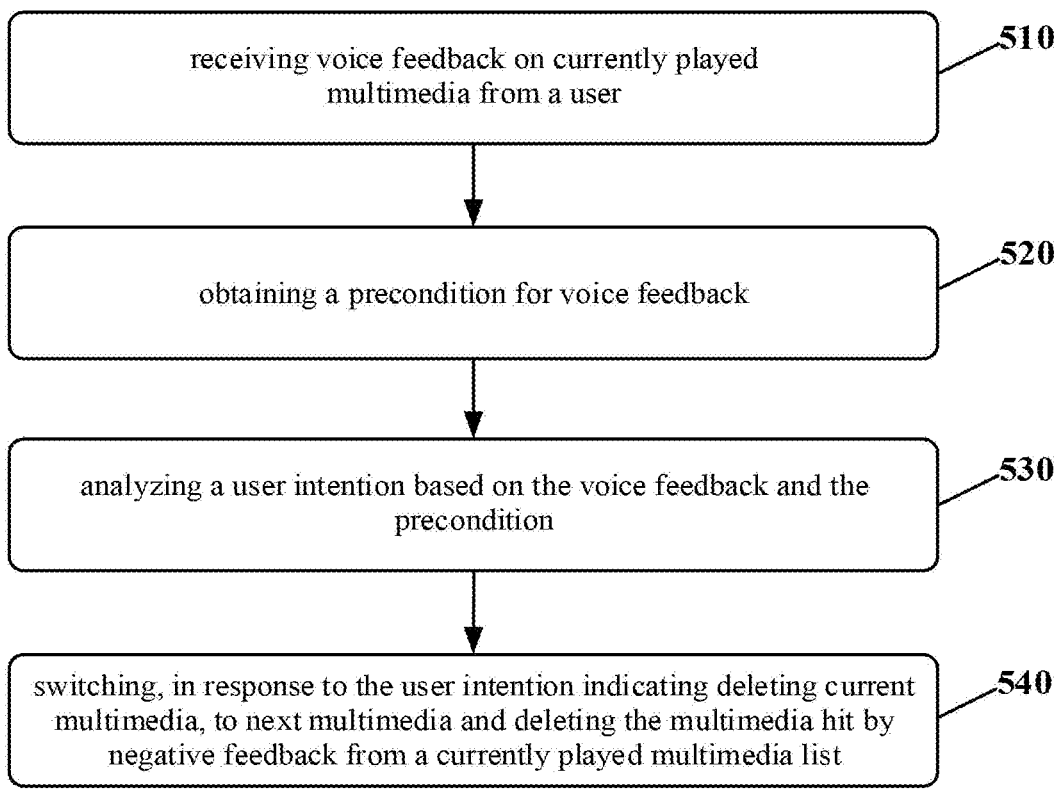
FIG. 5 is an illustrative process diagram of a fourth embodiment of an intelligent playing method based on preference feedback according to the disclosure.

Further referring to FIG. 5, an illustrative process of a fourth embodiment of an intelligent playing method based on preference feedback according to the disclosure is shown.

As shown in FIG. 5, the intelligent playing method 500 based on preference feedback includes:

In Step 510, voice feedback on currently played multimedia from a user is received.

In this embodiment, an electronic device (e.g., a server shown in FIG. 1 or a terminal device shown in FIG. 1) on which an intelligent playing method based on preference feedback runs may receive voice feedback inputted by a user through a microphone of a terminal device.

The voice feedback here is used for indicating users' opinions or comments on current multimedia played by a terminal device. For example, the voice feedback may include any one or more of the following items: voice feedback on multimedia; voice feedback on a predetermined multimedia list; voice feedback on a leading author of multimedia; and voice feedback on a multimedia tag. The multimedia here may be audio, video, or a combination thereof. The predetermined list here refers to a list, e.g., a topic list or an interest list, that is generated based on a predetermined topic or interest, and is selected by a user or provided by a terminal device application provider. The leading author here refers to a main author of multimedia. The tag here refers to a language, a style, a scenario, an emotion, a topic or the like of multimedia.

In Step 520, a precondition for voice feedback is obtained.

In this embodiment, an electronic device (e.g., a server shown in FIG. 1 or a terminal device shown in FIG. 1) on which an intelligent playing method based on preference feedback runs may obtain a precondition of current multimedia through an application of multimedia that is being played by a terminal device.

The precondition here refers to a playing instruction triggering playing current multimedia, such as on-demand random-based play, multimedia-based on-demand play, leading-author-based on-demand play, tag-based on-demand play, on-demand play of a list, or the like. Here, the on-demand random-based play refers to random-based play and multimedia-based on-demand play; the multimedia-based on-demand play refers to on-demand play based on a multimedia name; the leading-author-based on-demand play refers to on-demand play based on a leading author of multimedia; the tag-based on-demand play refers to on-demand play based on a multimedia tag; and the on-demand play of a list refers to on-demand play based on a multimedia list, such as on-demand play based on a topic list or an interest list.

In Step 530, a user intention is analyzed based on the voice feedback and the precondition.

In this embodiment, an electronic device on which an intelligent playing method based on preference feedback runs may identify real-time voice feedback as a text, implement semantic analysis of the text to obtain a semanteme included in the voice feedback, and then analyze a user intention based on the identified semanteme and a precondition.

The method for analyzing the user intention may be a method for analyzing a user intention in the prior art or a technique to be developed in the future, and is not limited in the disclosure. For example, a user intention may be analyzed using a preset rule, and may also be identified using a pre-trained user intention identification model.

The preset rule for analyzing a user intention may be obtained based on user settings or be concluded based on learning historical data of the user. When a semantic identification result of voice feedback and a precondition hit a condition existing in the preset rule, it indicates that the user intention is an action to be executed as provided in the preset rule. For example, based on historical data of a user: when a user sends voice feedback "I dislike the singer AA" to a smart loudspeaker box, and the precondition is "tag-based on-demand play", the user will have a high probability of inputting a voice request "switch to the next and delete songs of the singer AA from the currently played song list", and then based on the historical data of the user, the preset rule may be concluded by learning: when the real-time voice feedback meets a predetermined condition "I dislike the singer XX", and the precondition is "tag-based on-demand play", an executable action "switch to the next and delete songs of the singer AA from the currently played song list" may be obtained.

A pre-trained user intention identification model for analyzing a user intention may be a machine learning model obtained by training based on a large data sample including historical data of a user. By inputting voice feedback and a precondition or inputting a semantic identification result and the precondition into the machine learning model, a user intention outputted by the machine learning model may be obtained by analysis based on the voice feedback and the precondition or based on the semantic identification result and the precondition. For example, samples of an action "switch to the next and delete songs of the singer AA from the currently played song list" executed in response to the voice feedback "I dislike the singer AA" and a precondition "tag-based on-demand play" in historical data of a user may be learned through a convolutional neural network model, a recurrent neural network model or a deep neural network model to obtain the convolutional neural network model, the recurrent neural network model or the deep neural network model by training, and then the voice feedback "I dislike XX's song" inputted by the user and the precondition "tag-based on-demand play" are identified using the well-trained deep neural network model to obtain the user intention "switch to the next and delete songs of the singer AA from the currently played song list" of the voice feedback.

In Step 540, next multimedia is switched to and the multimedia hit by negative feedback is deleted from a currently played multimedia list in response to the user intention indicating deleting current multimedia.

In this embodiment, in response to the user intention indicating deleting current multimedia, next multimedia may be switched to and the multimedia hit by negative feedback may be deleted from a currently played multimedia list. For example, if the voice feedback is "I dislike the style CC", and the precondition is "on-demand play of a song", then next song may be switched to and songs of "CC style" may be deleted from a currently played multimedia list; while if the voice feedback is "I dislike the singer AA" and the precondition is "tag-based on-demand play", then next song may be switched to and songs of the singer "AA" may be deleted from a currently played multimedia list.

For example, some application scenarios of switching, in response to the user intention indicating deleting current multimedia, to next multimedia and deleting the multimedia hit by negative feedback from a currently played multimedia list are described below:

In a first scenario, in response to the voice feedback being negative feedback on multimedia and the precondition being leading-author-based on-demand play, tag-based on-demand play or on-demand play of an interest list, next multimedia is switched to and the multimedia hit by the negative feedback is deleted from a currently played multimedia list. For example, a user first inputs "I'd like to listen to AA's song" by voice, and then a terminal device plays AA's songs ordered by popularity, or the user first inputs "I'd like to listen to a sad song" by voice, and then the terminal device plays a sad song ordered by popularity, or the user first inputs "I'd like to listen to an interest list ABC" by voice, and then the terminal device plays a song in the interest list ABC. Then, the user sends voice feedback "I dislike the song" on the current song. Under the circumstance, next multimedia may be switched to, and the multimedia hit by the negative feedback may be deleted from the currently played multimedia list.

In a second scenario, in response to the voice feedback being negative feedback on a leading author of multimedia and the precondition being tag-based on-demand play or on-demand play of an interest list, next multimedia is switched to and the multimedia hit by the leading author involved in the negative feedback is deleted from a currently played multimedia list. For example, a user first inputs "I'd like to listen to a sad song" by voice, and then a terminal device plays a sad song ordered by popularity, or the user first inputs "I'd like to listen to an interest list ABC" by voice, and then the terminal device plays a song in the interest list ABC. Then, the user sends voice feedback "I dislike AA's (a leading author of the current song) song" on the current song. Under the circumstance, next multimedia may be switched to, and the multimedia hit by the negative feedback may be deleted from the currently played multimedia list.

In a third scenario, in response to the voice feedback being negative feedback on a multimedia tag and the precondition being multimedia-based on-demand play or on-demand play of an interest list, next multimedia is switched to, and the multimedia hit by the negative feedback is deleted from a currently played multimedia list. For example, a user first inputs "I'd like to listen to BB (a song name)", and then a terminal device plays BB of various versions ordered by popularity, or the user first inputs "I'd like to listen to a sad song" by voice, and then the terminal device plays a sad song ordered by popularity, or the user first inputs "I'd like to listen to an interest list ABC" by voice, and then the terminal device plays a song in the interest list ABC. Then, the user sends voice feedback "I dislike the style" on the current song. Under the circumstance, next multimedia may be switched to, and the multimedia hit by the negative feedback may be deleted from the currently played multimedia list.

An intelligent playing method based on preference feedback provided in the embodiments of the disclosure first receives voice feedback on currently played multimedia from a user; then obtains a precondition for the voice feedback, then analyzes a user intention based on the voice feedback and the precondition; and then switches, in response to the user intention indicating deleting the current multimedia, to next multimedia, and deleting the multimedia hit by the negative feedback from a currently played multimedia list. In this process, the next multimedia is switched to, and the multimedia hit by the negative feedback is deleted from the currently played multimedia list based on the user intention indicating deleting the current multimedia obtained by analysis based on the voice feedback and the precondition, so that the played multimedia better satisfies user demands, thereby improving the accuracy and pertinence in playing multimedia for users.

Figure 6:
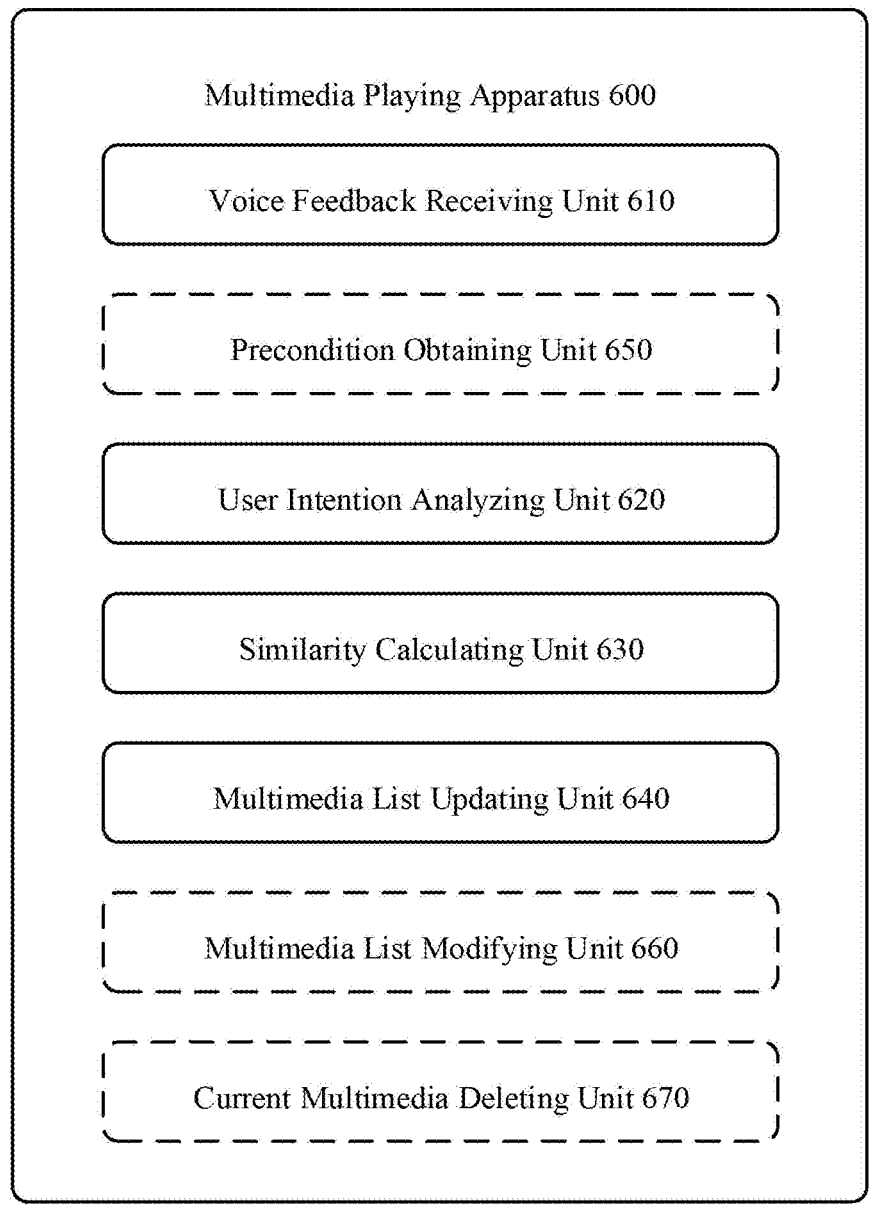
FIG. 6 is an illustrative structure diagram of an intelligent playing apparatus based on preference feedback according to the disclosure.

Further referring to FIG. 6, as implementation of the methods, the disclosure provides an embodiment of an intelligent playing apparatus based on preference feedback, the embodiment of the intelligent playing apparatus based on preference feedback corresponds to the embodiments of the intelligent playing methods based on preference feedback shown in FIG. 1 to in FIG. 5. Therefore, the foregoing operations and characteristics described for the intelligent playing methods based on preference feedback in FIG. 1 to FIG. 5 are also applicable to the intelligent playing apparatus 600 based on preference feedback and units included therein, and are not repeated any more here.

As shown in FIG. 6, the intelligent playing apparatus 600 based on preference feedback includes: a voice feedback receiving unit 610 for receiving voice feedback on currently played multimedia from a user; a user intention analyzing unit 620 for analyzing a user intention based on the voice feedback; a similarity calculating unit 630 for calculating, in response to the user intention indicating updating a currently played multimedia list, a similarity between multimedia in a multimedia database and the current multimedia; and a multimedia list updating unit 640 for updating the currently played multimedia list based on the voice feedback and the similarity.

In some embodiments, the multimedia list updating unit is further used for: ordering, in response to the voice feedback being positive feedback, multimedia in a multimedia database by similarity in a descending order to obtain a positive ranking list, and updating a currently played multimedia list using a preset number of popular multimedia in the positive ranking list based on the positive feedback; and ordering, in response to the voice feedback being negative feedback, multimedia in a multimedia database by similarity in an ascending order to obtain a negative ranking list, and updating a currently played multimedia list using a preset number of popular multimedia in the negative ranking list based on the negative feedback.

In some embodiments, the apparatus further includes: a precondition obtaining unit 650 for obtaining a precondition for the voice feedback; the user intention analyzing unit 620 is further used for: analyzing a user intention based on the voice feedback and the precondition; and the multimedia list updating unit 640 is further used for: updating the currently played multimedia list based on the voice feedback, the precondition and the similarity.

In some embodiments, the multimedia list updating unit 640 is further used for: ordering, in response to the voice feedback being positive feedback, multimedia in a multimedia database by similarity in a descending order to obtain a positive ranking list, and updating a currently played multimedia list using a preset number of popular multimedia in the positive ranking list based on the positive feedback and the precondition; and ordering, in response to the voice feedback being negative feedback, multimedia in a multimedia database by similarity in an ascending order to obtain a negative ranking list, and updating a currently played multimedia list using a preset number of popular multimedia in the negative ranking list based on the negative feedback and the precondition.

In some embodiments, the multimedia list updating unit 640 is further used for: updating, in response to the positive feedback being positive feedback on multimedia or a leading author of multimedia and the precondition being random-based play, follow-up multimedia in a currently played multimedia list using a preset number of popular multimedia in a positive ranking list; updating, in response to the positive feedback being positive feedback on a multimedia tag and the precondition being random-based play, follow-up multimedia in a currently played multimedia list using a preset number of popular multimedia including a tag identical to the tag involved in the positive feedback in a positive ranking list; and updating, in response to the positive feedback being positive feedback on a multimedia tag and the precondition being leading-author-based on-demand play, follow-up multimedia in a currently played multimedia list preferentially using a preset number of popular multimedia of the current leading author and including a tag identical to the tag involved in the positive feedback in a positive ranking list.

In some embodiments, the multimedia list updating unit 640 is further used for: updating, in response to the negative feedback being negative feedback on multimedia and the precondition being random-based play or multimedia-based on-demand play, current multimedia and follow-up multimedia in a currently played multimedia list using a preset number of popular multimedia in a negative ranking list, and deleting the multimedia hit by the negative feedback from the currently played multimedia list; and updating, in response to the negative feedback being negative feedback on a multimedia tag and the precondition being random-based play or tag-based on-demand play, current multimedia and follow-up multimedia in a currently played multimedia list using a preset number of popular multimedia including a tag different from the tag involved in the negative feedback in a negative ranking list, and deleting the multimedia hit by the tag involved in the negative feedback from the currently played multimedia list.

In some embodiments, the apparatus further includes: a multimedia list modifying unit 660 for modifying, in response to the user intention indicating modifying a currently played multimedia list, a currently played multimedia list based on voice feedback and a precondition; and/or a current multimedia deleting unit 670 for switching, in response to the user intention indicating deleting current multimedia, to next multimedia and deleting the multimedia hit by the negative feedback from a currently played multimedia list.

In some embodiments, the multimedia list modifying unit 660 is further used for: modifying, in response to the negative feedback being negative feedback on a leading author of multimedia and the precondition being multimedia-based on-demand play, current multimedia and follow-up multimedia in a currently played multimedia list using a preset number of popular multimedia by other leading author and of the same name as the multimedia involved in the negative feedback in a multimedia database, and deleting the multimedia hit by the negative feedback from the currently played multimedia list; modifying, in response to the negative feedback being negative feedback on a leading author of multimedia and the precondition being random-based play or leading-author-based on-demand play, current multimedia and follow-up multimedia in a currently played multimedia list using a preset number of popular multimedia by a leading author other than the leading author involved in the negative feedback in the multimedia database, and deleting the multimedia hit by the leading author involved in the negative feedback from the currently played multimedia list; and modifying, in response to the negative feedback being negative feedback on a multimedia tag and the precondition being leading-author-based on-demand play, current multimedia and follow-up multimedia in a currently played multimedia list using a preset number of popular multimedia including a tag of a current leading author and different from the tag involved in the negative feedback in the multimedia database, and deleting the multimedia hit by the tag involved in the negative feedback from the currently played multimedia list.

In some embodiments, the current multimedia deleting unit 670 is further used for: switching, in response to the voice feedback being negative feedback on multimedia and the precondition being leading-author-based on-demand play, tag-based on-demand play or on-demand play of an interest list, to next multimedia and deleting the multimedia hit by the negative feedback from a currently played multimedia list; switching, in response to the voice feedback being negative feedback on a leading author of multimedia and the precondition being on-demand play of a tag or on-demand play of an interest list, to next multimedia, and deleting the multimedia hit by the leading author involved in the negative feedback from a currently played multimedia list; and switching, in response to the voice feedback being negative feedback on a multimedia tag and the precondition being multimedia-based on-demand play or on-demand play of an interest list, to next multimedia, and deleting the multimedia hit by the tag involved in the negative feedback from a currently played multimedia list.

The disclosure further provides an embodiment of a system, including: one or more processors; and a storage device for storing one or more programs, where the one or more programs, when executed by the one or more processors, enable the one or more processors to implement the intelligent playing methods based on preference feedback according to any one of the embodiments.

The disclosure further provides an embodiment of a computer readable storage medium storing computer programs, where the programs, when executed by a processor, enable to implement the intelligent playing methods based on preference feedback according to any one of the embodiments.

Below referring to FIG. 7, a structural diagram of a computer system 700 of a terminal device or a server applicable for implementing the embodiments of the disclosure is shown. The terminal device shown in FIG. 7 is only an example, and shall not limit the functions and serviceable range of the embodiments of the disclosure in any way.

Figure 7:
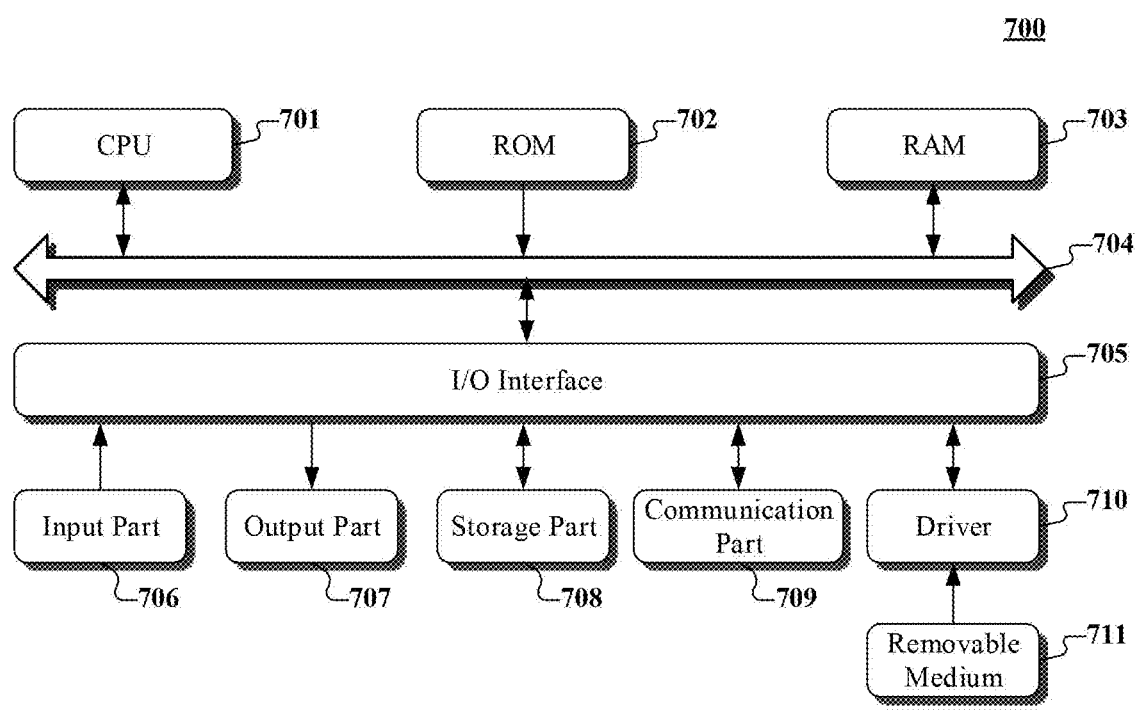
FIG. 7 is a structural diagram of a computer system of a terminal device or a server applicable for implementing embodiments of the disclosure.

As shown in FIG. 7, a computer system 700 includes a central processing unit (CPU) 701, which may execute appropriate actions and processing based on programs stored in a read-only memory (ROM) 702 or programs uploaded from a storage part 708 into a random access memory (RAM) 703. In RAM 703, programs and data required to operate the system 700 are also stored. The CPU 701, the ROM 702 and the RAM 703 are connected to each other via a bus 704. An input/output (I/O) interface 705 is also connected to the bus 704.

The following parts are connected to the I/O interface 705: an input part 706 including a keyboard, a mouse and so on; an output part 707 including a cathode ray tube (CRT), a liquid crystal display (LCD) or the like and a loudspeaker 707 or the like; a storage part 708 including a hard disk or the like; and a communication part 709 including a network interface card, such as a LAN card and a modem. The communication part 709 executes communication processing via a network, such as the Internet. A driver 710 is also connected to the I/O interface 705 as required. A removable medium 711, such as a disk, an optical disk, a magneto-optical disk or a semiconductor memory, is installed on the driver 710 as required, in order to install computer programs read thereon into the storage part 708 as required.

In particular, the process described in the foregoing reference process diagram may be implemented as a computer software program according to the disclosed embodiment. For example, the disclosed embodiment includes a computer program product, which includes a computer program carried on a computer readable medium, and the computer program contains a program code for executing the methods shown in the process diagrams. In such an embodiment, the computer program may be downloaded and installed from a network via the communication part 709, and/or installed from the removable medium 711. When the computer program is executed by the central processing unit (CPU) 701, the functions defined in the methods of the embodiments of the disclosure are executed.

It should be noted that the computer readable medium according to the embodiments of the disclosure may be a computer readable signal medium or a computer readable storage medium or any combination thereof. The computer readable storage medium, e.g., may be, but is not limited to, an electrical, magnetic, optical, electromagnetic, infrared or semiconductor system, device, or appliance, or any combination thereof. More specific examples of the computer readable storage medium may include, but is not limited to: an electrical connection including one or more wires, a portable computer disk, a hard disk, a random access memory (RAM), a read-only memory (ROM), an erasable programmable read-only memory (EPROM or flash memory), an optical fiber, a portable compact disk read only memory (CD-ROM), an optical storage device, a magnetic storage device, or any appropriate combination thereof. In the embodiments of the disclosure, the computer readable storage medium may be any tangible medium containing or storing programs, and the programs may be used by an instruction execution system, device, or appliance or a combination thereof. In the embodiments of the disclosure, the computer readable signal medium may be included in a baseband or may be a data signal transmitted as a part of a carrier wave and carrying a computer readable program code. The data signal may be transmitted in a plurality of forms, including but not limited to: an electromagnetic signal, an optical signal or any appropriate combination thereof. The computer readable signal medium may also be any computer readable medium other than the computer readable storage medium, and the computer readable medium may send or transmit programs for use in an instruction execution system, appliance or device or a combination thereof. The program code contained on the computer readable medium may be transmitted using any appropriate medium, including but not limited to: wireless, wire, optical cable, RF, etc., or any appropriate combination thereof.

The flowcharts and block diagrams in the figures illustrate architectures, functions and operations that may be implemented according to the system, the method and the computer program product of the various embodiments. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a voice feedback receiving unit, a user intent analyzing unit, where the names of these units or modules are not considered as a limitation to the units or modules a similarity calculating unit and a multimedia list updating unit, where the names of these units or modules are not considered as a limitation to the units or modules. For example, the receiving unit may also be described as "a unit for receiving voice feedback on currently played multimedia from a user".

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: receive voice feedback on currently played multimedia from a user; analyze a user intention based on the voice feedback; calculate, in response to the user intention indicating updating a currently played multimedia list, a similarity between multimedia in a multimedia database and the current multimedia; and update the currently played multimedia list based on the voice feedback and the similarity.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept(s) of the disclosure, such as, technical solutions formed by replacing the features as disclosed in the present application with (but not limited to), technical features with similar functions.

What is claimed is:

1. An intelligent playing method based on preference feedback, the method comprising:
   receiving voice feedback on currently played multimedia from a user;
   obtaining a precondition for the voice feedback, wherein the voice feedback comprises positive feedback and negative feedback, and the precondition refers to a playing instruction for triggering playing of current multimedia, and comprises random-based play, multimedia-based on-demand play, leading-author-based on-demand play, tag-based on-demand play, and list-based on-demand play;
   analyzing a user intention based on the voice feedback and the precondition comprising the random-based play, multimedia-based on-demand play, leading-author-based on-demand play, tag-based on-demand play, and list-based on-demand play;
   calculating, in response to the user intention indicating updating a currently played multimedia list, a similarity between multimedia in a multimedia database and the currently played multimedia; and
   updating the currently played multimedia list based on the voice feedback and the similarity;
   wherein the method is performed by at least one processor; and
   wherein the updating the currently played multimedia list based on the voice feedback and the similarity comprises: updating the currently played multimedia list based on the voice feedback, the similarity, and the precondition comprising the random-based play, multimedia-based on-demand play, leading-author-based on demand play, tag-based on-demand play, and list-based on-demand play;
   wherein the method further comprises:
   modifying, in response to the user intention indicating modifying the currently played multimedia list, the currently played multimedia list based on the voice feedback and the precondition; and/or switching, in response to the user intention indicating deleting the current multimedia, to next multimedia and deleting multimedia hit by the negative feedback from the currently played multimedia list;
   wherein the modifying, in response to the user intention indicating modifying the currently played multimedia list, the currently played multimedia list comprises:
   modifying, in response to the negative feedback being negative feedback on a leading author of multimedia and the precondition being the multimedia-based on-demand play, current multimedia and follow-up multimedia in the currently played multimedia list using a preset number of popular multimedia by another leading author and of the same name as the multimedia hit by the negative feedback in the multimedia database, and deleting the multimedia hit by the negative feedback from the currently played multimedia list;
   modifying, in response to the negative feedback being negative feedback on a leading author of multimedia and the precondition being the random-based play or the leading-author-based on-demand play, the current multimedia and the follow-up multimedia in the currently played multimedia list using a preset number of popular multimedia by a leading author other than the leading author involved in the negative feedback in the multimedia database, and deleting multimedia hit by the leading author involved in the negative feedback from the currently played multimedia list; and
   modifying, in response to the negative feedback being negative feedback on a multimedia tag and the precondition being the leading-author-based on-demand play, the current multimedia and the follow-up multimedia in the currently played multimedia list using a preset number of popular multimedia having a tag of a current leading author and different from the multimedia tag involved in the negative feedback in the multimedia database, and deleting the multimedia hit by the multimedia tag involved in the negative feedback from the currently played multimedia list.

2. The method according to claim 1, wherein the updating the currently played multimedia list based on the voice feedback and the similarity comprises:

ordering, in response to the voice feedback being the positive feedback, the multimedia in the multimedia database in a descending order based on the similarity to obtain a positive ranking list, and updating the currently played multimedia list using a preset number of popular multimedia in the positive ranking list based on the positive feedback; and ordering, in response to the voice feedback being the negative feedback, the multimedia in the multimedia database in an ascending order based on the similarity to obtain a negative ranking list, and updating the currently played multimedia list using a preset number of popular multimedia in the negative ranking list based on the negative feedback.

3. The method according to claim 1, wherein the updating the currently played multimedia list based on the voice feedback, the precondition and the similarity comprises:

ordering, in response to the voice feedback being the positive feedback, the multimedia in the multimedia database in a descending order based on the similarity to obtain a positive ranking list, and updating the currently played multimedia list using a preset number of popular multimedia in the positive ranking list based on the positive feedback and the precondition; and ordering, in response to the voice feedback being the negative feedback, the multimedia in the multimedia database in an ascending order based on the similarity to obtain a negative ranking list, and updating the currently played multimedia list using a preset number of popular multimedia in the negative ranking list based on the negative feedback and the precondition.

4. The method according to claim 3, wherein the updating the currently played multimedia list using a preset number of popular multimedia in the positive ranking list based on the positive feedback and the precondition comprises:

updating, in response to the positive feedback being positive feedback on multimedia or a leading author of multimedia and the precondition being the random-based play, the follow-up multimedia in the currently played multimedia list using the preset number of popular multimedia in the positive ranking list;

updating, in response to the positive feedback being positive feedback on a multimedia tag and the precondition being the random-based play, the follow-up multimedia in the currently played multimedia list using a preset number of popular multimedia having a tag identical to a positive feedback tag in the positive ranking list; and updating, in response to the positive feedback being positive feedback on the multimedia tag and the precondition being the leading-author-based on-demand play, the follow-up multimedia in the currently played multimedia list preferentially using a preset number of popular multimedia by a current leading author and having a tag identical to the positive feedback tag in the positive ranking list.

5. The method according to claim 3, wherein the updating the currently played multimedia list using a preset number of popular multimedia in the negative ranking list based on the negative feedback and the precondition comprises:

updating, in response to the negative feedback being negative feedback on multimedia and the precondition being the random-based play or the multimedia-based on-demand play, the current multimedia and the follow-up multimedia in the currently played multimedia list using the preset number of popular multimedia in the negative ranking list, and deleting the multimedia hit by the negative feedback from the currently played multimedia list; and updating, in response to the negative feedback being negative feedback on a multimedia tag and the precondition being the random-based play or the tag-based on-demand play, the current multimedia and the follow-up multimedia in the currently played multimedia list using a preset number of popular multimedia having a tag different from a negative feedback tag in the negative ranking list, and deleting the multimedia hit by the multimedia tag involved in the negative feedback from the currently played multimedia list.

6. The method according to claim 1, wherein the switching, in response to the user intention indicating deleting the current multimedia, to next multimedia and deleting the multimedia hit by the negative feedback from the currently played multimedia list comprises:

switching, in response to the voice feedback being the negative feedback on multimedia and the precondition being the leading-author-based on-demand play, the tag-based on-demand play or interest-list-based on-demand play, to the next multimedia and deleting the multimedia hit by the negative feedback from the currently played multimedia list;

switching, in response to the voice feedback being the negative feedback on the leading author of multimedia and the precondition being the tag-based on-demand play or the interest-list-based on-demand play, to the next multimedia, and deleting the multimedia hit by the leading author involved in the negative feedback from the currently played multimedia list; and switching, in response to the voice feedback being the negative feedback on the multimedia tag and the precondition being the multimedia-based on-demand play or the interest-list-based on-demand play, to the next multimedia, and deleting the multimedia hit by the tag involved in the negative feedback from the currently played multimedia list.

7. An intelligent playing apparatus based on preference feedback, the apparatus comprising:

at least one processor; and a memory storing instructions, which when executed by the at least one processor, cause the at least one processor to perform operations, the operations comprising:

receiving voice feedback on currently played multimedia from a user;

obtaining a precondition for the voice feedback, wherein the voice feedback comprises positive feedback and negative feedback, and the precondition refers to a playing instruction for triggering playing of current multimedia, and comprises random-based play, multimedia-based on-demand play, leading-author-based on-demand play, tag-based on-demand play, and list-based on-demand play;

analyzing a user intention based on the voice feedback and the precondition comprising the random-based play, multimedia-based on-demand play, leading-author-based on-demand play, tag-based on-demand play, and list-based on-demand play; calculating, in response to the user intention indicating updating a currently played multimedia list, a similarity between multimedia in a multimedia database and the currently played multimedia; and updating the currently played multimedia list based on the voice feedback and the similarity;

wherein the updating the currently played multimedia list based on the voice feedback and the similarity comprises: updating the currently played multimedia list based on the voice feedback, and the similarity, and the precondition comprising the random-based play, multimedia-based on-demand play, leading-author-based on-demand play, tag-based on-demand play, and list-based on-demand play;

wherein the operations further comprise:

modifying, in response to the user intention indicating modifying the currently played multimedia list, the currently played multimedia list based on the voice feedback and the precondition; and/or switching, in response to the user intention indicating deleting the current multimedia, to next multimedia and deleting multimedia hit by the negative feedback from the currently played multimedia list;

wherein the modifying, in response to the user intention indicating modifying the currently played multimedia list, the currently played multimedia list comprises:

modifying, in response to the negative feedback being negative feedback on a leading author of multimedia and the precondition being the multimedia-based on-demand play, current multimedia and follow-up multimedia in the currently played multimedia list using a preset number of popular multimedia by another leading author and of the same name as the multimedia hit by the negative feedback in the multimedia database, and deleting the multimedia hit by the negative feedback from the currently played multimedia list;

modifying, in response to the negative feedback being negative feedback on a leading author of multimedia and the precondition being the random-based play or the leading-author-based on-demand play, the current multimedia and the follow-up multimedia in the currently played multimedia list using a preset number of popular multimedia by a leading author other than the leading author involved in the negative feedback in the multimedia database, and deleting the multimedia hit by the leading author involved in the negative feedback from the currently played multimedia list; and modifying, in response to the negative feedback being negative feedback on a multimedia tag and the precondition being the leading-author-based on-demand play, the current multimedia and the follow-up multimedia in the currently played multimedia list using a preset number of popular multimedia having a tag of a current leading author and different from the multimedia tag involved in the negative feedback in the multimedia database, and deleting the multimedia hit by the multimedia tag involved in the negative feedback from the currently played multimedia list.

8. The apparatus according to claim 7, wherein the updating the currently played multimedia list based on the voice feedback and the similarity comprises:

ordering, in response to the voice feedback being the positive feedback, the multimedia in the multimedia database in a descending order based on the similarity to obtain a positive ranking list, and updating the currently played multimedia list using a preset number of popular multimedia in the positive ranking list based on the positive feedback; and ordering, in response to the voice feedback being the negative feedback, the multimedia in the multimedia database in an ascending order based on the similarity to obtain a negative ranking list, and updating the currently played multimedia list using a preset number of popular multimedia in the negative ranking list based on the negative feedback.

9. The apparatus according to claim 7, wherein the updating the currently played multimedia list based on the voice feedback, the precondition and the similarity comprises:

ordering, in response to the voice feedback being the positive feedback, the multimedia in the multimedia database in a descending order based on the similarity to obtain a positive ranking list, and updating the currently played multimedia list using a preset number of popular multimedia in the positive ranking list based on the positive feedback and the precondition; and ordering, in response to the voice feedback being the negative feedback, the multimedia in the multimedia database in an ascending order based on the similarity to obtain a negative ranking list, and updating the currently played multimedia list using a preset number of popular multimedia in the negative ranking list based on the negative feedback and the precondition.

10. The apparatus according to claim 9, wherein the updating the currently played multimedia list using a preset number of popular multimedia in the positive ranking list based on the positive feedback and the precondition comprises:

updating, in response to the positive feedback being positive feedback on multimedia or a leading author of multimedia and the precondition being the random-based play, the follow-up multimedia in the currently played multimedia list using the preset number of popular multimedia in the positive ranking list;

updating, in response to the positive feedback being positive feedback on a multimedia tag and the precondition being the random-based play, the follow-up multimedia in the currently played multimedia list using a preset number of popular multimedia having a tag identical to the tag involved in the positive feedback in the positive ranking list; and updating, in response to the positive feedback being positive feedback on a multimedia tag and the precondition being the leading-author-based on-demand play, follow-up multimedia in the currently played multimedia list preferentially using a preset number of popular multimedia by a current leading author and having a tag identical to the tag involved in the positive feedback in the positive ranking list.

11. The apparatus according to claim 9, wherein the updating the currently played multimedia list using a preset number of popular multimedia in the negative ranking list based on the negative feedback and the precondition comprises:

updating, in response to the negative feedback being negative feedback on multimedia and the precondition being the random-based play or the multimedia-based on-demand play, the current multimedia and the follow-up multimedia in the currently played multimedia list using the preset number of popular multimedia in the negative ranking list, and deleting a the multimedia hit by the negative feedback from the currently played multimedia list; and updating, in response to the negative feedback being negative feedback on the multimedia tag and the precondition being the random-based play or the tag-based on-demand play, the current multimedia and the follow-up multimedia in the currently played multimedia list using a preset number of popular multimedia having a tag different from the tag involved in the negative feedback in the negative ranking list, and deleting the multimedia hit by the multimedia tag involved in the negative feedback from the currently played multimedia list.

12. The apparatus according to claim 7, wherein the switching, in response to the user intention indicating deleting the current multimedia, to next multimedia and deleting the multimedia hit by the negative feedback from the currently played multimedia list comprises:

switching, in response to the voice feedback being the negative feedback on multimedia and the precondition being the leading-author-based on-demand play, the tag-based on-demand play or interest-list-based on-demand play, to the next multimedia and deleting the multimedia hit by the negative feedback from the currently played multimedia list;

switching, in response to the voice feedback being the negative feedback on the leading author of multimedia and the precondition being the tag-based on-demand play or the interest-list-based on-demand play, to the next multimedia, and deleting the multimedia hit by the leading author involved in the negative feedback from the currently played multimedia list; and switching, in response to the voice feedback being the negative feedback on the multimedia tag and the precondition being the multimedia-based on-demand play or the interest-list-based on-demand play, to the next multimedia, and deleting the multimedia hit by the tag involved in the negative feedback from the currently played multimedia list.

13. A non-transitory computer storage medium storing computer programs, wherein the programs, when executed by a processor, cause the processor to perform operations, the operations comprising:

receiving voice feedback on currently played multimedia from a user; obtaining a precondition for the voice feedback, wherein the voice feedback comprises positive feedback and negative feedback, and the precondition refers to a playing instruction for triggering playing of current multimedia, and comprises random-based play, multimedia-based on-demand play, leading-author-based on-demand play, tag-based on-demand play, and list-based on-demand play;

analyzing a user intention based on the voice feedback and the precondition comprising the random-based play, multimedia-based on-demand play, leading-author-based on-demand play, tag-based on-demand play, and list-based on-demand play; calculating, in response to the user intention indicating updating a currently played multimedia list, a similarity between multimedia in a multimedia database and the currently played multimedia; and updating the currently played multimedia list based on the voice feedback and the similarity;

wherein the updating the currently played multimedia list based on the voice feedback and the similarity comprises: updating the currently played multimedia list based on the voice feedback, the similarity, and the precondition comprising the random-based play, multimedia-based on-demand play, leading-author-based on-demand play, tag-based on-demand play, and list-based on-demand play;

wherein the operations further comprise:

modifying, in response to the user intention indicating modifying the currently played multimedia list, the currently played multimedia list based on the voice feedback and the precondition; and/or switching, in response to the user intention indicating deleting the current multimedia, to next multimedia and deleting multimedia hit by the negative feedback from the currently played multimedia list;

wherein the modifying, in response to the user intention indicating modifying the currently played multimedia list, the currently played multimedia list comprises:

modifying, in response to the negative feedback being negative feedback on a leading author of multimedia and the precondition being the multimedia-based on-demand play, current multimedia and follow-up multimedia in the currently played multimedia list using a preset number of popular multimedia by another leading author and of the same name as the multimedia hit by the negative feedback in the multimedia database, and deleting the multimedia hit by the negative feedback from the currently played multimedia list;

modifying, in response to the negative feedback being negative feedback on a leading author of multimedia and the precondition being the random-based play or the leading-author-based on-demand play, the current multimedia and the follow-up multimedia in the currently played multimedia list using a preset number of popular multimedia by a leading author other than the leading author involved in the negative feedback in the multimedia database, and deleting multimedia hit by the leading author involved in the negative feedback from the currently played multimedia list; and modifying, in response to the negative feedback being negative feedback on a multimedia tag and the precondition being the leading-author-based on-demand play, the current multimedia and the follow-up multimedia in the currently played multimedia list using a preset number of popular multimedia having a tag of a current leading author and different from the multimedia tag involved in the negative feedback in the multimedia database, and deleting the multimedia hit by the multimedia tag involved in the negative feedback from the currently played multimedia list.

\* \* \* \* \*